(12) United States Patent
Jung et al.

(10) Patent No.: US 8,146,357 B2
(45) Date of Patent: Apr. 3, 2012

(54) SELF ASSEMBLING/QUICK ASSEMBLY STRUCTURE USING SHAPE MEMORY ALLOY MATERIALS

(75) Inventors: Edward K. Y. Jung, Bellevue, WA (US); Clarence T. Tegreene, Bellevue, WA (US)

(73) Assignee: The Invention Science Fund I LLC

( * ) Notice: Subject to any disclaimer, the term of this patent is extended or adjusted under 35 U.S.C. 154(b) by 601 days.

(21) Appl. No.: 12/291,112

(22) Filed: Nov. 5, 2008

(65) Prior Publication Data

US 2009/0071146 A1 Mar. 19, 2009

Related U.S. Application Data

(63) Continuation-in-part of application No. 11/262,500, filed on Oct. 28, 2005, now Pat. No. 7,469,538, and a continuation-in-part of application No. 11/262,494, filed on Oct. 28, 2005.

(51) Int. Cl.
*F01B 29/10* (2006.01)

(52) U.S. Cl. ............................................ 60/527; 60/528

(58) Field of Classification Search ............. 60/527–529
See application file for complete search history.

(56) References Cited

U.S. PATENT DOCUMENTS

| | | | |
|---|---|---|---|
| 4,869,085 A | 9/1989 | Meissner | |
| 5,722,709 A | 3/1998 | Lortz et al. | |
| 5,931,838 A | 8/1999 | Vito | |
| 6,073,469 A | 6/2000 | Julien | |
| 6,840,700 B1 | 1/2005 | Nusskern et al. | |
| 6,860,689 B1 | 3/2005 | Attanasio | |
| 6,875,931 B2 | 4/2005 | Combs et al. | |
| 6,889,411 B2 | 5/2005 | Hinkley et al. | |
| 7,029,056 B2 | 4/2006 | Browne et al. | |
| 7,331,616 B2 | 2/2008 | Brei et al. | |
| 7,406,846 B2 | 8/2008 | Chu | |
| 7,469,538 B2 * | 12/2008 | Jung et al. | 60/527 |
| 2002/0032443 A1 * | 3/2002 | Sherman et al. | 606/61 |
| 2004/0035687 A1 | 2/2004 | von Behrens et al. | |
| 2004/0104580 A1 | 6/2004 | Spiessl et al. | |
| 2004/0117955 A1 | 6/2004 | Barvosa-Carter et al. | |
| 2004/0244358 A1 | 12/2004 | Prytz | |
| 2005/0172462 A1 | 8/2005 | Rudduck et al. | |
| 2005/0212304 A1 | 9/2005 | Herrera et al. | |
| 2006/0012190 A1 | 1/2006 | Alacqua et al. | |

FOREIGN PATENT DOCUMENTS

| | | |
|---|---|---|
| EP | 0 034 500 A1 | 2/1981 |
| GB | 1439848 A | 6/1976 |
| GB | 1554433 A | 10/1979 |
| WO | WO 90/12237 | 10/1990 |

OTHER PUBLICATIONS

Supplementary European Search Report; European App. No. EP 06 82 7031; Nov. 24, 2009; pp. 1-6.

Brown, H. Benjamin Jr.; Vande Weghe, J. Michael; Bererton, Curt A.; Khosla, Pradeep K.; "Millibot Trains for Enhanced Mobility", IEEE/ASME Transactions on Mechatronics, Dec. 2002; pp. 452-461; vol. 7, No. 4.

(Continued)

*Primary Examiner* — Hoang Nguyen

(57) ABSTRACT

A shape memory alloy material may be incorporated in an assembly structure.

38 Claims, 7 Drawing Sheets

OTHER PUBLICATIONS

Cesari, E.; Pons, J.; Santamarta, R.; Segui, C.; Chernenko, V.A..; "Ferromagnetic Shape Memory Alloys: An Overview"; Archives of Metallurgy and Materials; bearing dates of 2004 and Nov. 3, 2004; pp. 779-789; vol. 49; Issue 4.

Davis, J.R.; Davis & Associates (Editors); *Metals Handbook, Desk Edition* (Second Edition); ASM International; copyright 1998; pp. 668-669.

Mihálcz, István "Fundamental Characteristics and Design Method for Nickel-Titanium Shape Memory Alloy"; Periodica Polytechnica Ser. Mech. Eng.; bearing dates of Apr. 5, 2000 and 2001; pp. 75-86; vol. 45, No. 1.

Zou, W.H.; Lam, C.W.H.; Chung, C.Y.; and Lai, J.K.L; "Microstructural Studies of a Cu-Zn-Al Shape-Memory Alloy with Manganese and Zirconium Addition"; Metallurgical and Materials Transactions A, bearing dates of Jun. 23, 1997 and Jul. 1998; p. 1865; vol. 29A.

UK Intellectual Property Office Examination Report under Section 18(3); App. No. GB0809353.6 ; Nov. 12, 2010; pp. 1-3.

UK Intellectual Property Office Examination Report Under Section 18(3); App. No. GB0809353.6; bearing a date of Apr. 11, 2011; pp. 1-2.

\* cited by examiner

US 8,146,357 B2

SELF ASSEMBLING/QUICK ASSEMBLY STRUCTURE USING SHAPE MEMORY ALLOY MATERIALS

RELATED APPLICATIONS

For purposes of the USPTO extra-statutory requirements, the present application constitutes a continuation-in-part of U.S. patent application Ser. No. 11/262,500, entitled SELF ASSEMBLING/QUICK ASSEMBLY STRUCTURE USING SHAPE MEMORY ALLOY MATERIALS, naming EDWARD K. Y. JUNG and CLARENCE T. TEGREENE as inventors, filed 28 Oct. 2005, now U.S. Pat. No. 7,469,538, or is an application of which a application is entitled to the benefit of the filing date.

For purposes of the USPTO extra-statutory requirements, the present application constitutes a continuation-in-part of U.S. patent application Ser. No. 11/262,494, entitled ADAPTIVE ENGAGING ASSEMBLY, naming EDWARD K. Y. JUNG AND CLARENCE T. TEGREENE as inventors, filed 28 Oct. 2005, which is currently co-pending or is an application of which a currently co-pending application is entitled to the benefit of the filing date.

TECHNICAL FIELD

The present application relates, in general, to shape memory alloys and to fasteners.

SUMMARY

An embodiment provides an apparatus that includes a first piece, a stop, and an assembly that includes a shape memory alloy. In addition to the foregoing, other embodiments are described in the claims, drawings, and text forming a part of the present application.

DETAILED DESCRIPTION

A shape memory alloy is a material that can change shape or attempt to change shape upon transfer (including loss or gain) of energy, such energy including thermal, electrical, magnetic, electromagnetic, mechanical, or a different form of energy. Properties of shape memory alloys are summarized in METALS HANDBOOK, Eds. J. R. Davis, Davis and Associates; Desk Edition, Second Edition; ASM International: Materials Park, Ohio, 1998; pp 668-669, which is incorporated herein by reference. Note that, in some contexts herein, shape memory alloy may respond to directly applied energy such as heat or may respond to indirectly provided energy, as may be the case for example where energy is provided via a magnetic field or through local heating from an applied current.

Shape memory alloys may be useful in the fabrication of a fastener, latch, or hinge, as described, for example, in U.S. Pat. No. 6,889,411 entitled SHAPE MEMORY METAL LATCH HINGE DEPLOYMENT METHOD to Hinkley, et al.; U.S. Pat. No. 6,875,931 entitled RETAINER FOR CIRCUIT BOARD ASSEMBLY AND METHOD FOR USING THE SAME to Combs, et al.; U.S. Pat. No. 6,860,689 entitled FASTENING ASSEMBLIES AND COMPONENTS THEREOF to Attanasio; and U.S. Pat. No. 6,840,700 entitled MECHANICAL CONNECTING ELEMENT to Nusskern, et al., each of which is incorporated herein by reference.

Figure 1B:
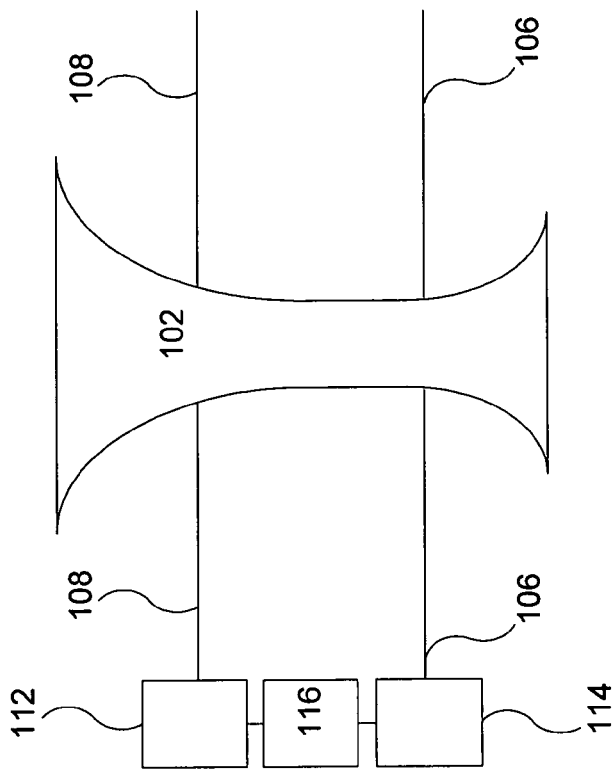
FIG. 1b shows a first embodiment of the apparatus in a second configuration.
Figure 1A:
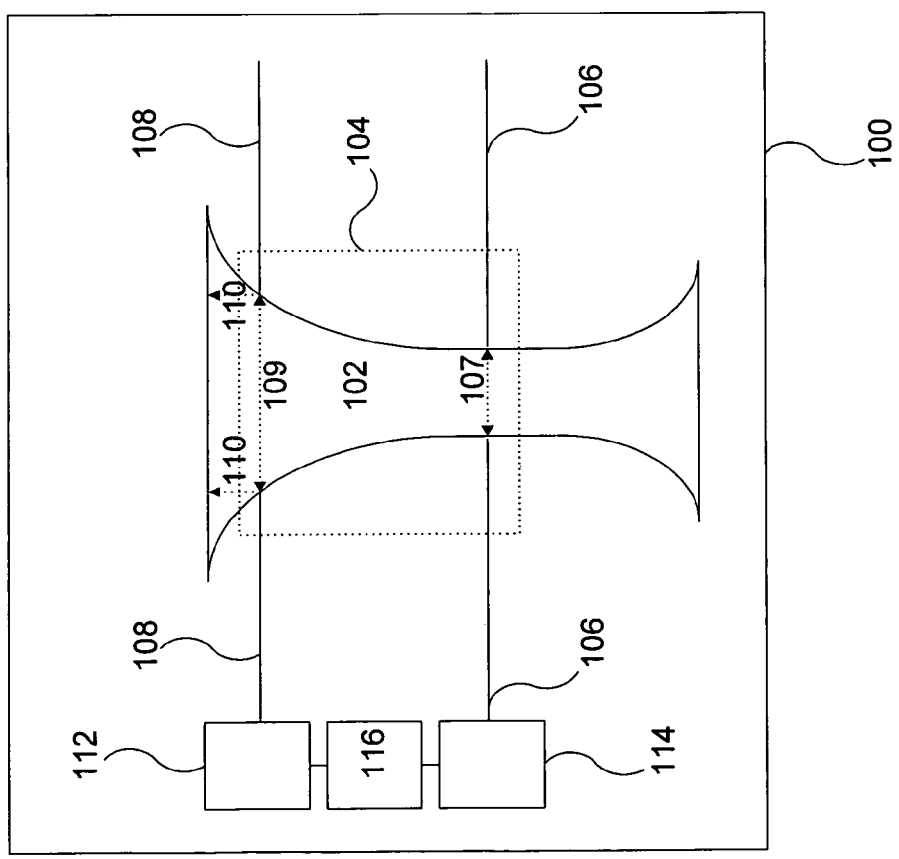
FIG. 1a shows a first embodiment of the apparatus in a first configuration.

FIGS. 1a and 1b show the cross section of a first embodiment of an apparatus 100 where an assembly 108 includes a shape memory alloy that is configured proximate to a segment 104 of a first piece 102, where FIG. 1a shows a first configuration and FIG. 1b shows a different configuration of the same apparatus shown in FIG. 1a. The assembly 108 may include an assembly aperture 109 that is large enough to allow the first piece 102 to pass.

The shape memory alloy may include NiTi, CuZnAl, CuAlNi, FeMnSi, or a different material having shape memory properties. As is described in W. H. Zou, C. W. H. Lam, C. Y. Chung, J. K. L. Lai, "Microstructural Studies of a Cu—Zn—Al Shape-Memory Alloy with Manganese and Zirconium Addition", Metallurgical and Materials Transactions A, Volume 29A, July 1998, 1865, which is incorporated herein by reference, materials may be added in order to improve the memory of the shape memory alloy. The transition temperatures of the material depends on the particular alloy, and may be tuned by varying the elemental ratios. The transition temperatures of the material may also depend on stresses applied to the material, and the material shape may vary according to varying stresses applied as is described in István Mihálcz, "Fundamental Characteristics and Design Method for Nickel-Titanium Shape Memory Alloy", Periodica Polytechnica Ser. Mech. Eng. Vol. 45, No. 1, PP. 75-86 (2001), which is incorporated herein by reference. In another aspect, the shape memory alloy may be a ferromagnetic shape memory alloy that may change shape in response to an applied magnetic field as well as to temperature and stress changes as in other shape memory alloys, as described in E. Cesari, J. Pons, R. Santamarta, C. Segui, V. A. Chernenko, "Ferromagnetic Shape Memory Alloys: An Overview", Archives of Metallurgy and Materials, Volume 49, Issue 4, 2004, which is incorporated herein by reference.

The assembly 108 may be configured to transfer thermal, electrical, electromagnetic, or a different form of energy, in some cases to or from an energy bank 112. The energy bank 112 may be a circuit configured to exchange electrical energy with the assembly 108, an electromagnetic field, a material such as water that may be configured to exchange thermal energy with the assembly 108, a heat source or a heat sink, a magnetic field, or a different configuration designed to exchange energy with the assembly 108. In a relatively straightforward illustrative case, the energy bank may be a battery powered current source. The assembly 108, upon transfer of said energy, may change shape, causing the first piece 102 to move in a direction 110 relative to the assembly 108.

In the embodiment shown in FIGS. 1a and 1b, the first piece 102 is configured so that lateral dimensions of the assembly 108 in FIG. 1a increase upon transfer of energy. The perimeter of the first piece 102 engages the assembly 108 non-perpendicularly. As the assembly 108 attempts to expand, force increases between the first piece 102 and the assembly 108. Because the engagement is non-perpendicular, the force includes a vector component that urges the first piece 102 in the direction 110. The stop 106 is configured with an aperture 107 having a size and location such that when the first piece 102 is urged in the direction 110, the perimeter of the first piece 102 engages with the perimeter of the stop 106, which limits the motion of the first piece 102 in the direction 110. In one embodiment, the first piece 102 may be mateable, and may be attached to, another object at a mounting site.

In one embodiment, the stop 106 may comprise a shape memory alloy such as those listed previously for the assembly 108, where the stop 106 may be configured to change shape to adjust the position of the first piece 102 relative to the stop 106. In this case the stop may be configured to transfer energy to or from an energy bank 114, where the energy bank 114 may include those listed as examples previously for the energy bank 112.

The energy banks 112, 114 may be controlled by a control system 116 that may establish the amount and timing of energy transfer. Further, the control system 116 may include a sensor to affect the amount of control signal, where the sensor may be an optical, force, pressure, resistance, or other type of sensor.

In one embodiment, FIGS. 1a and 1b show cross sections of an apparatus 100 having substantially circular symmetry where the apertures 107 and 109 are substantially round apertures. In other embodiments, FIGS. 1a and 1b show cross sections of an apparatus 100 that does not have circular symmetry. For example, the assembly 108 may comprise rods that are configured to increase in length to exert a force on the first piece 102, or the stop 106 may comprise rods that are configured to change in length to control the position of the first piece 102.

Although the illustrative example of FIGS. 1a and 1b has the first piece 102 with an hourglass shape, one skilled in the art may extend the embodiment to other configurations, such as a substantially double-hourglass, or an even more complex shape potentially resembling a key structure, where the assembly 108 and the stop 106 may be positioned at a number of different places along the first piece 102. Further, the first piece 102 may have portions having substantially parallel sides, portions where the slope of the sides is substantially constant, or portions of the sides where the side is not smooth, for example to increase friction between the first piece 102 and the assembly 108 or the stop 106.

The illustrative example of FIGS. 1a and 1b has been described such that FIG. 1a represents the rest state and FIG. 1b represents a state achieved after energy transfer. However, the initial rest state and activated states may be reversed such that FIG. 1b represents the rest state and FIG. 1a represents a state achieved after energy transfer.

In some cases it may be desirable to increase the force between the assembly 108 and the first piece 102 and/or the force between the stop 106 and the first piece 102 after they have already made contact and are not in motion relative to each other. For example, in situations where it is desirable to maximize the force between the assembly 108 and the stop 106 and the first piece 102, energy may be supplied or withdrawn from the system to provide the desired amount of force. Further, the apparatus 100 may include one or more components or devices that may provide additional force or control, which may be a clamp, pliers, or other such device. Such components may provide mechanical gain or concentrate forces locally or provide other spatial distributions of force. In such approaches, mechanical structures allow the vector of force provided by the assembly 108 may be parallel to, opposite to, at an acute or obtuse angle relative to, or even perpendicular to the direction at which force is applied to the first piece.

Figure 2:
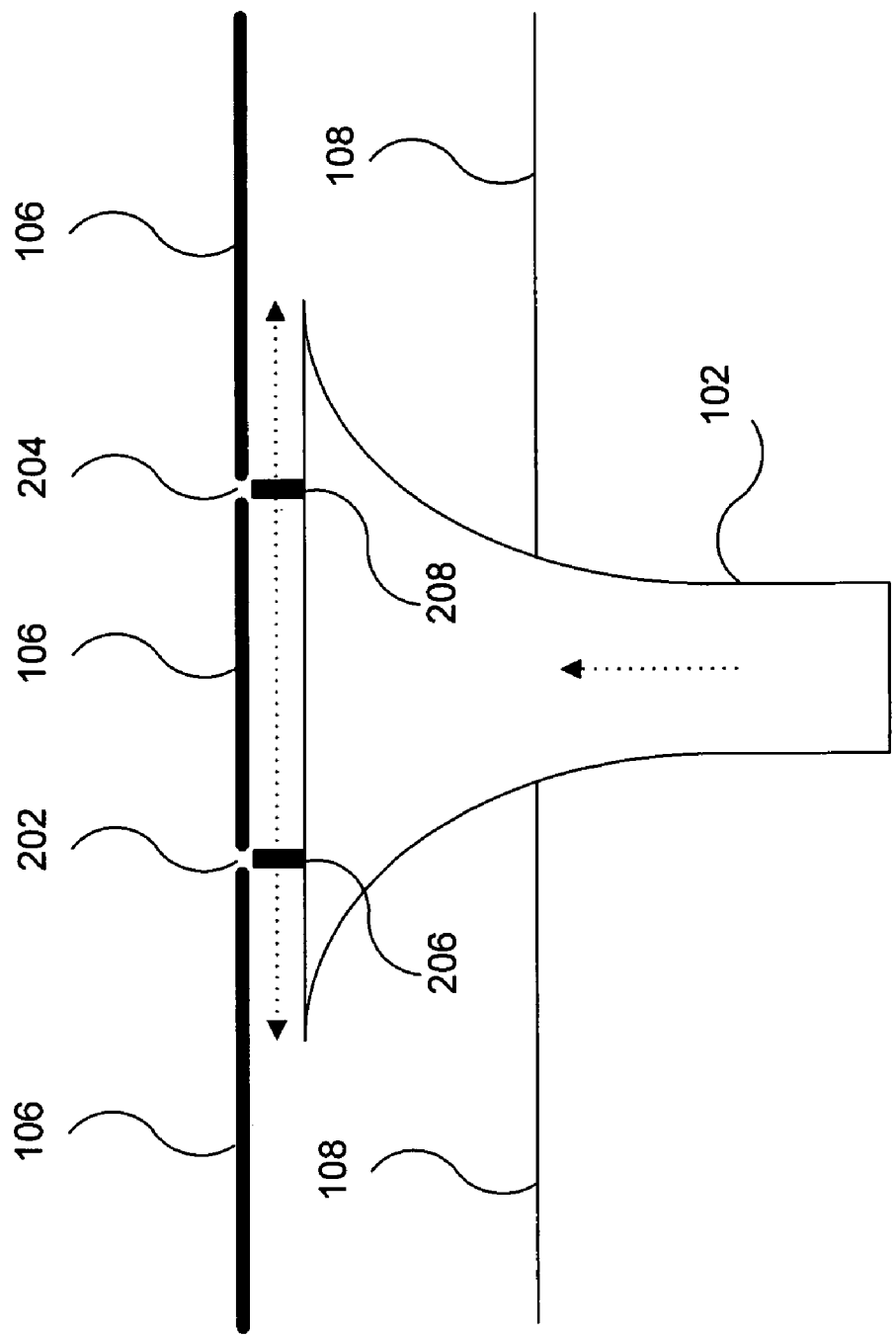
FIG. 2 shows a second embodiment of the apparatus.

FIGS. 1a and 1b also show an exemplary embodiment of the stop 106 as including the stop aperture 107 that engages the periphery of the first piece 102, however other configurations may also limit the relative motion between the first piece 102 and the assembly 108. For example, as shown in FIG. 2, the first piece 102 does not pass through the stop 106. In this embodiment, the stop 106 is shown as a substantially solid plane with apertures 202, 204 that accept protrusions 206, 208. The apertures 202, 204 are shown as being too small to allow the first piece 102 to pass. In still another approach, the stop 106 may include the protrusions 206, 208 and the assembly may include the apertures 202, 204. In another embodiment, the protrusions 206, 208 may engage a solid face of the stop 106 or may engage other structures configured to mate with the protrusions.

Figure 3B:
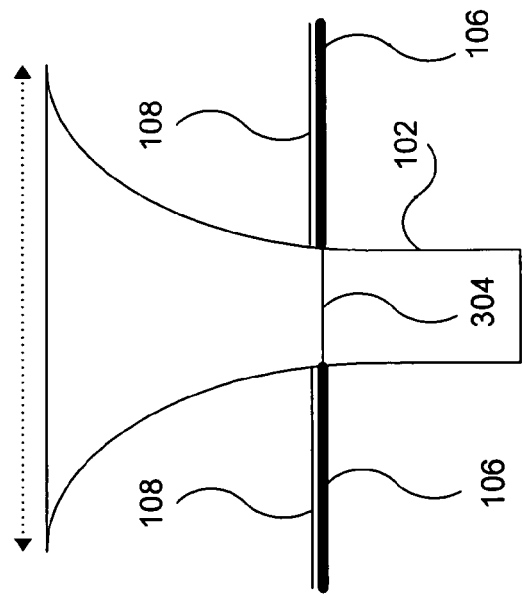
FIG. 3b shows a third embodiment of the apparatus in a second configuration.
Figure 3A:
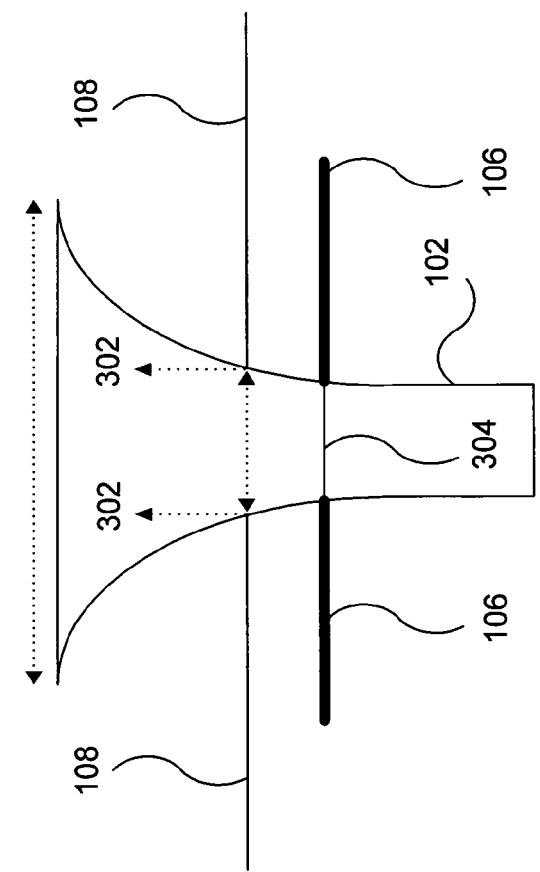
FIG. 3a shows a third embodiment of the apparatus in a first configuration.

FIGS. 3a and 3b show another embodiment, where FIG. 3a shows a first configuration and FIG. 3b shows a different configuration of the same apparatus shown in FIG. 3a. In FIGS. 3a and 3b the stop 106 includes a rod 304 that passes through the first piece 102. In one embodiment, the rod may be permanently affixed to the first piece 102, and in another embodiment, the rod 304 may be configured to pass through the first piece 102. In this case, the rod 304 may comprise a shape memory alloy that may be configured to expand according to conditions. The assembly 108 is configured with a shape memory alloy that responds to input energy by expanding. The assembly 108 is shaped such that, as it expands it places a force on the first piece 102 urging the first piece 102 to move in a direction 302. The stop 106 limits motion of the first piece 102, such that the first piece 102 is held in place against the stop 106. Once again, as described with respect to FIGS. 1a and 1b, the selection of rest state and activated state can be reversed. Thus, FIG. 3a may represent the activated state and FIG. 3b may represent the rest state in some applications. The selection of which state to select as the rest or activated state can be a design choice depending upon the application.

Figure 4:
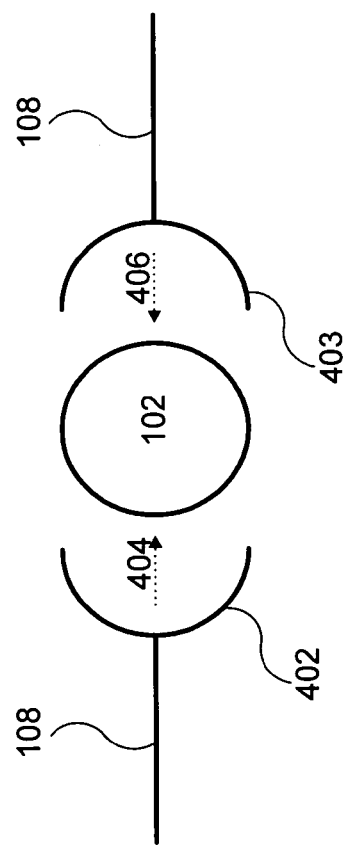
FIG. 4 shows a first embodiment of the assembly.

In an embodiment, a top view of which is shown in FIG. 4, each of two assemblies 108 includes a respective handle 402, 403 at its distal end. The assemblies are responsive to input energy to move the handles 402, 403 toward each other in directions 404, 406 to grip the first piece 102.

While FIG. 4 shows two handles 402, 403 being shaped as semicircles to grip the first piece 102, which, in this embodiment, has a substantially round cross-section, a variety of other configurations and shapes may be implemented. For example, other embodiments may have a different number of handles, handles of different shapes, other mating surfaces, or other geometrical placements of the assemblies. Further, the handles may be carried by the stop 106, or both the assembly 108 and the stop 106 may include handles.

Figure 5:
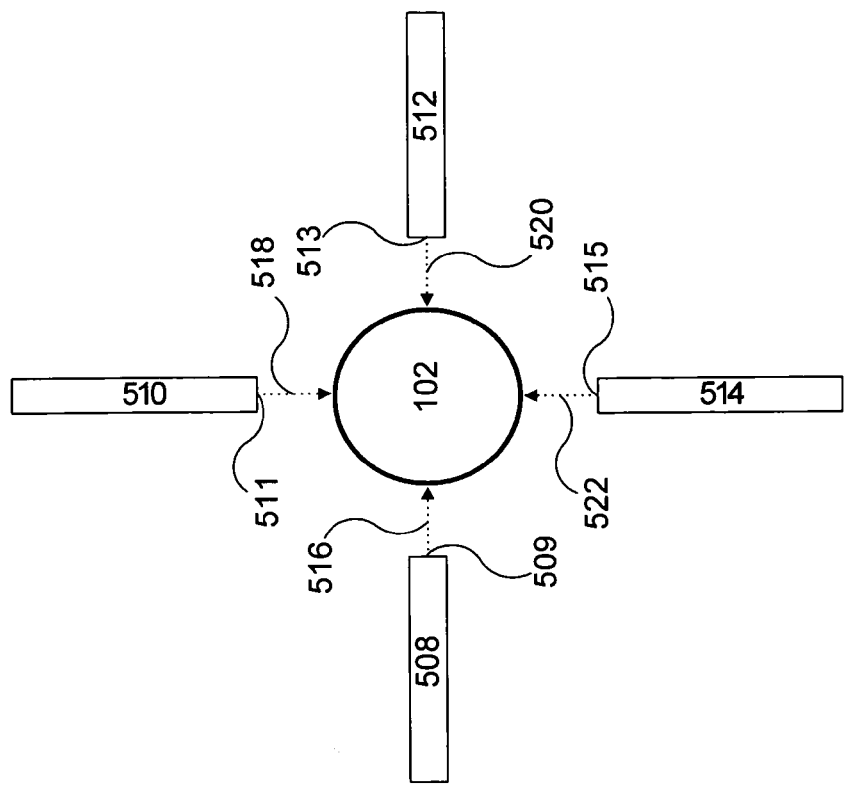
FIG. 5 shows a second embodiment of the assembly.

In a similar embodiment, the top view of which is shown in FIG. 5, the assembly 108 includes four arms 508, 510, 512, 514 having respective distal ends 509, 511, 513, 515 that are configured to move in directions 516, 518, 520, 522 responsive to input energy. As the distal ends move, they make contact with the first piece 102. FIG. 5 shows four substantially rod-shaped arms 508, 510, 512, 514 configured to make contact with the first piece 102, which, in this embodiment, is round, but in other embodiments there may be a different number of arms and they may have a different shape. Further, the stop 106 may include arms similar to those in FIG. 5, or both the assembly 108 and the stop 106 may include the arms.

Figure 6:
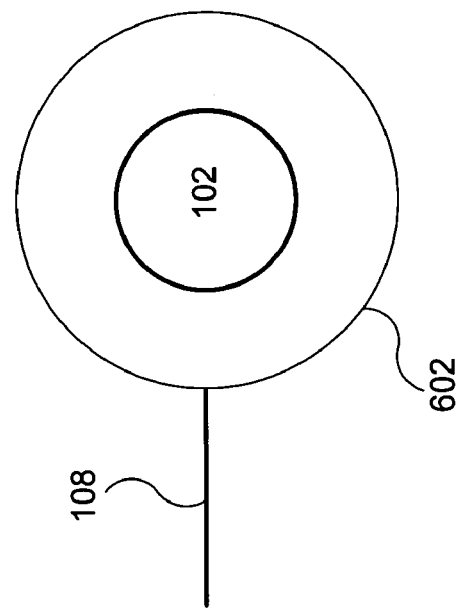
FIG. 6 shows a third embodiment of the assembly.

In a similar embodiment, the top view of which is shown in FIG. 6, the assembly 108 includes an encircling portion 602 configured to tighten to make contact with the first piece 102, thereby acting as a cinch. FIG. 6 shows one encircling portion 602 configured to make contact with the first piece 102, which, in this embodiment, is round, but in other embodiments the first piece 102 and the encircling portion 602 may have a different shape and may be substantially rectilinear or irregularly shaped. Further, the encircling portion 602 is shown in FIG. 6 and entirely enclosing the first piece 102, however in some cases the encircling portion 602 may not completely enclose the first piece 102, as is the case in FIG. 7. Moreover, while the inner surface of the encircling portion 602 is shown as smooth, the surface may be adapted to mate to the first piece 102. For example, the inner surface may include pins, teeth, serrations, bevels or other shapes and the first piece may include complementary features. Such features may increase retention strength in some applications.

Figure 7:
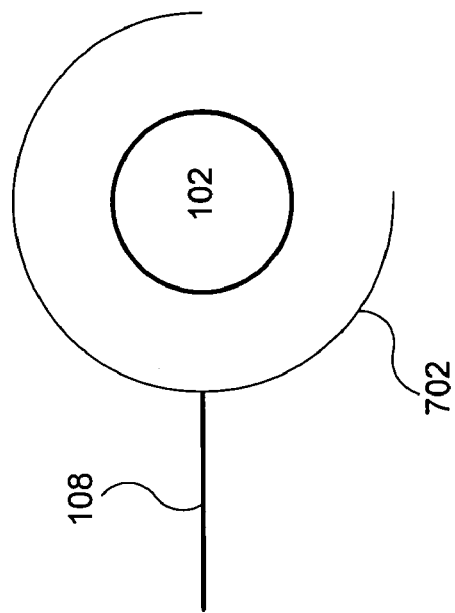
FIG. 7 shows a fourth embodiment of the assembly.

FIG. 7 shows an embodiment where a partially encircling portion, 702, is configured to close around the first piece 102 in a grasping fashion. The embodiments shown in FIGS. 6 and 7 (as well as structures corresponding to other embodiments) may be configured such that the encircling portion 602 and/or the partially encircling portion 702 may be substantially helical rather than confined to a single plane. Further, although FIGS. 6 and 7 show one encircling portion 602 and one partially encircling portion 702, in some embodiments the apparatus may comprise more than one encircling portion 602 or partially encircling portion 702. Further, although FIGS. 6 and 7 show the assembly 108 including an encircling portion 602 or partially encircling portion 702, in other embodiments the stop 106 may include an encircling portion 602 or partially encircling portion 702. Additionally, each of these embodiments may be adapted to implement features described with respect to any of the other embodiments, such as types of energy applied, mating features or other aspects.

Figure 8A:
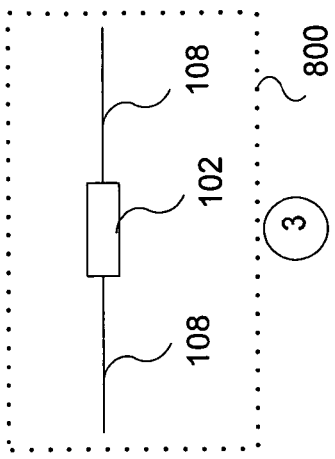
FIGS. 8a-8f show different perspectives and configurations of a fourth embodiment of the apparatus.
Figure 8B:
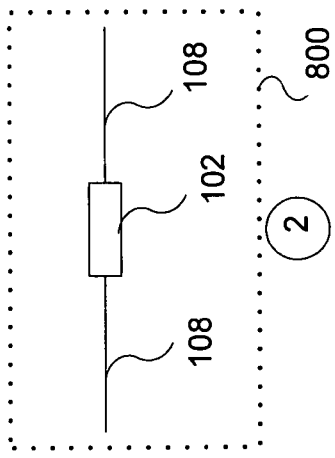
Figure 8C:
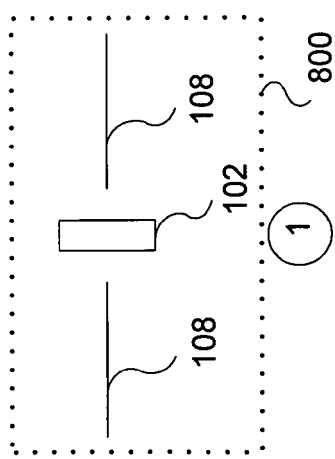
Figure 8D:
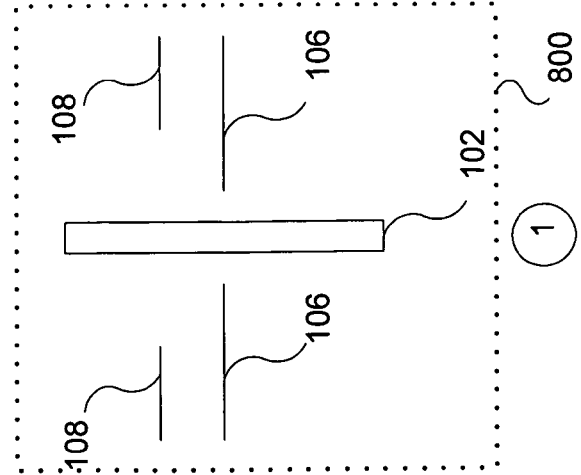
Figure 8E:
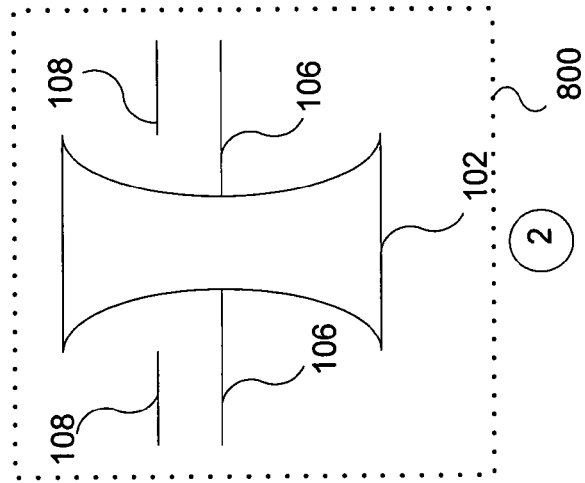
Figure 8F:
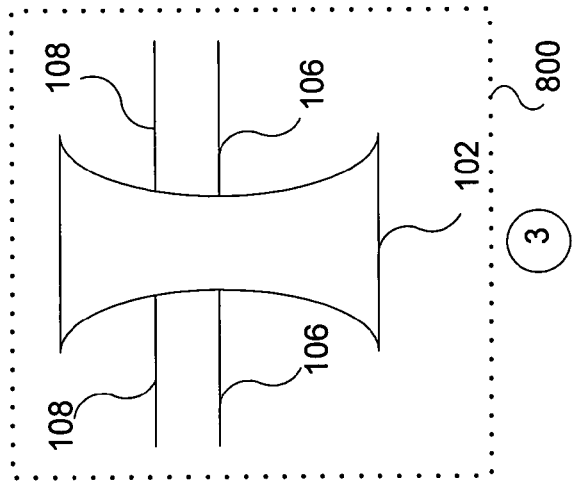

FIGS. 8*a-f* show one embodiment where the first piece 102 (the "key") is a structure sized and shaped to enter the apertures 107, 109, and the assembly 108 (which, in this embodiment, forms the "lock") is a structure configured with a shape memory alloy. In one state, the key 102 can turn to position it relative to the lock 108 and the stop 106 (which, in this embodiment, forms the "retainer"). FIGS. 8*a*, 8*b*, and 8*c* show top views of the apparatus 800 and FIGS. 8*d*, 8*e*, and 8*f* show side views of the apparatus 800. FIGS. 8*a* and 8*d* show the apparatus 800 after the key 102 has entered the apertures 107, 109. The FIGS. 8*b* and 8*e* show the apparatus 800 after the key 102 has been rotated relative to the lock 108 and the retainer 106. In FIGS. 8*b* and 8*e*, the apparatus 800 is shown with the key 102 and the retainer 106 in contact, however it may be that rotating the key 102 is not sufficient for the key 102 to make contact with the retainer 106, and the retainer 106 may be configured with a shape memory alloy configured to change in shape to make contact with the key 102 upon transfer of energy. FIGS. 8*c* and 8*f* show the apparatus 800 in the final "locked" position, where energy has been transferred to the lock 108 to change its shape such that it has made contact with the key 102.

While the representation of FIGS. 8*a-f* show a simple structure having rectangular and hourglass cross sections, other more complex structures can be implemented as well. For example, the key 102 may include a series of indentations and projections of various sizes, shapes and depths, rather than an hourglass shape. Further, the key 102 may comprise a shape memory alloy, where the height or depth of the respective indentations or projections would be a function of the energy input to the key. The corresponding lock 108 would then include a number of surfaces that mate to corresponding indentations and projections. The configuration may or may not include the retainer 106. In a simple implementation, each of the mating surfaces is at a distal end of a respective pin. For a given energy input, the heights and depths of the respective indentations and projections correspond to a key structure that will drive the pins to the proper position to permit the key to turn to a second position, as in a conventional lock.

In one embodiment, opening the lock involves rotating the key 102 from the second position to a third position. However, the depths and heights of the indentations and the projections to rotate from the second position to the third position are different from those to rotate from the input orientation to the second position.

To establish the new depths and heights, a new level of input energy is applied to the key. Local regions, or in a simple case, the entire key, expand or contract, to set new depths and heights. At a selected temperature or other energy state, the new depths and heights correspond to the depths and heights that permit the key to turn from the second position to the third position.

While the illustrative embodiment includes input energy at two positions, the process can be extended to establish three or more sets of depths and heights. Moreover, the key 102 may be configured to rotate from the initial position to the second position, the second position to the third position or other stages at the rest state. Further, energy states may be repeated in some cases. For example, rotation from the initial position to the second position and from the third position to a fourth position may both be established at the rest state.

Figure 9:
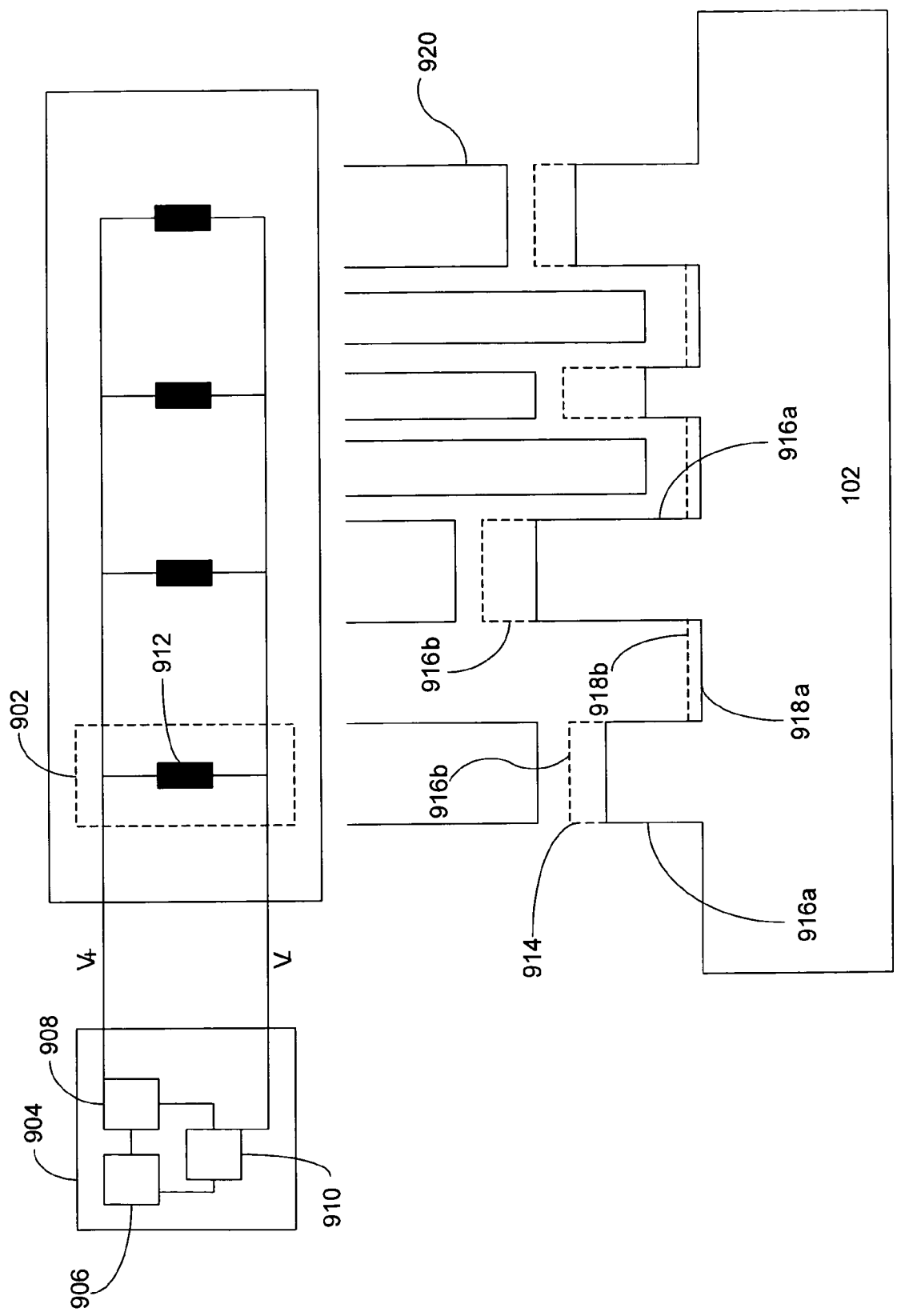
FIG. 9 is a diagrammatic representation of a key having local resistive regions.

Also, as noted above, the key may include a plurality of regions that may each receive a respective energy input different from those of the other regions. As shown in FIG. 9, the key 102 may include a set of N sections 902 proximate to respective projections 916*a* and indentations 918*a*, where the section 902 and its corresponding projection 916*a* and/or indentation 918*a* form a region of the key. Each section 902 is electrically coupled to a power source 904, that may include a battery 906, microprocessor 908, and/or other electrical circuitry 910. The regions 916*a* may be substantially isolated from each other, electrically and/or thermally. For example, where the input energy is electrical energy insulative gaps or barriers may provide electrical isolation. The regions may also be electrically insulated from the main portion of the key.

In one approach, the power source 904 provides energy input in the form of an electrical current having a respective amplitude that heats a resistive segment 912 at each respective region 902 to provide localized heating. The amount of heating energy may be established by controlling the current and/or by the magnitude of the local resistance.

In one simple embodiment, the energy input may be a DC input, such as may be applied by a battery, other DC source, or AC source having a substantially constant amplitude. The voltage applied can be defined through a variable resistance or similar structure for regulating voltages. Where the input is DC or constant amplitude AC, the relative current, and thus the amount of resistive heating at each region 902 is established by the relative magnitudes of the resistances 912. As represented by the broken line 914 in FIG. 9, segments of the key 102 expand differentially corresponding to the amount of local heat energy to establish a new set of projections 916*b* and indentations 918*b*.

In use, the first set of projections 916*a* and indentations 918*a* engage pins 920 or other typical lock features. If the heights and depths of the projections 916*a* and indentations 918a correspond to the proper pin locations, the lock (main body not shown) permits rotation from an initial position to a second position. Note that the pins 920 are shown slightly separated from the projections 916a and indentations 918a for clarity of presentation, although in operation, the pins 920 would typically contact the projections 916a and indentations 918b.

After rotation to the second position, the power source 904 provides energy and the key 102 assumes the shape represented by the broken line 914 to establish the new set of projections 916b and indentations 918b. The new set of projections 916b and indentations 918b engages a second set of pins (not shown). Once again if the heights and depths of the projections 916b and indentations 918b correspond to the proper pin positions, the key can rotate to a third position. As noted previously, in some embodiments, a larger number of rotational positions and energy levels can be established to provide even more control.

Note that although the structures in the illustrative embodiments of FIGS. 8a-9 are described herein as a key and a lock, other structures that provide interactive activation may also be implemented. For example, the structure corresponding to the lock may be an electrical switch, such as an automobile ignition switch or a secure activation switch for an electrical device. Similarly, the structure corresponding to the lock may be a release mechanism having features similar to or dissimilar to a lock.

In some applications, the approaches shown herein may be implemented at very small scales, for example on the micron scale or even smaller. For example, a 150 μm shape memory alloy is described in H. B. Brown, Jr., J. M. Vande Weghe, C. A. Bererton, and P. K. Khosla, "Millibot Trains for Enhanced Mobility", IEEE/ASME Transactions on Mechatronics, Volume 7, Number 4, December 2002, which is incorporated herein by reference.

The embodiments described singularly may also be configured in arrays where multiple apparatuses are employed. The apparatuses may be connected to individual circuits and each controlled separately, or they may be connected to a common circuit and controlled simultaneously. In this case, they may all transfer substantially the same amount of energy or they may transfer different amounts of energy. The energy transferred to or from the apparatuses may be controlled by a computer or by another apparatus. Further, the apparatuses may be configured in such a way that they must be assembled in a certain order, in which energy may be transferred to or from the apparatuses in this order.

Although the embodiments in FIGS. 1-9 are generally described as having a rest state where the assembly 108 and the stop 106 are not engaged with the first piece 102, it may be that for any of the embodiments the assembly 108 and/or the stop 106 are engaged with the first piece 102 in the rest state, and may be configured to become disengaged upon transfer of energy.

Although only the embodiment shown in FIGS. 1a and 1b include energy banks 112 and 114 and a control system 116, one or more energy banks or their equivalent and a control system may be included in any of the embodiments shown in FIG. 1-9. Such control system may include electrical circuitry that establishes the amount, location, or other features of the input energy. Additionally, such electrical circuitry may interact with forms of feedback, such as sensing rotation of a lock, local temperature, absolute or relative movement of objects, or other aspects, to provide additional control of various aspects of operation.

The apparatus described above may have a variety of applications. For example, it may be configured as a fastener in a variety of environments, including for quick-assembling furniture. It may also be used in situations where it is desirable to assemble and dissemble something quickly, such as in assembly line operations. In this configuration, something such as a circuit board may pass to a position on an assembly line to a position where the board is to be worked on, and the apparatus may be used to keep the board in a fixed position during this operation. Further, the apparatus may be useful in situations where a fastener is needed and electrical energy or another form of energy is more easily supplied to the apparatus than mechanical energy. It may be used in situations where two parts assemble and dissemble frequently and quick assembly or disassembly is desired, such as on skis. It may be used as a connector in places that are difficult to access such as for braces on teeth or within a body. Or, it may be included in a lock and key configuration, where turning a key creates an electrical connection which assembles or dissembles the apparatus. The apparatus may be incorporated in toys that are configured to be assembled by the user, or the apparatus may be included in the design of a toy similar to legos.

The foregoing detailed description has set forth various embodiments of the apparatuses and/or processes via the use of block diagrams, diagrammatic representations, and examples. Insofar as such block diagrams, diagrammatic representations, and examples contain one or more functions and/or operations, it will be understood as notorious by those within the art that each function and/or operation within such block diagrams, diagrammatic representations, or examples can be implemented, individually and/or collectively, by a wide range of hardware, materials, components, or virtually any combination thereof.

Those skilled in the art will recognize that it is common within the art to describe apparatuses and/or processes in the fashion set forth herein, and thereafter use standard engineering practices to integrate such described apparatuses and/or processes into elements, processes or systems.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. An apparatus comprising:
 a first piece, an assembly, and a stop;
 said first piece having a segment and being configured to rotate between a first orientation and a second orientation with respect to the assembly;
 said assembly being configured to pass the first piece when the first piece is in the first orientation and to block passage of the first piece and to engage the segment when the first piece is in the second orientation, said assembly including a first shape memory alloy responsive to an energy transfer to apply a force to the segment along the transverse direction, the segment being shaped to translate the first piece along a selected path responsive to the transverse force, the selected path being non-parallel to the direction of the transverse force; and
 said stop being positioned to limit movement of the segment along the selected path.

2. The apparatus of claim 1 wherein the stop is located axially relative to the segment.

3. The apparatus of claim 1 wherein the segment is shaped to translate the first piece axially responsive to the transverse force.

4. The apparatus of claim 1 wherein the first shape memory alloy comprises NiTi.

5. The apparatus of claim 1 wherein the first shape memory alloy comprises CuZnAl.

6. The apparatus of claim 1 wherein the first shape memory alloy comprises CuAlNi.

7. The apparatus of claim 1 wherein the first shape memory alloy comprises FeMnSi.

8. The apparatus of claim 1 wherein the first shape memory alloy comprises a ferromagnetic shape memory alloy.

9. An apparatus comprising:
 a first piece, said first piece having an engagement surface and being configured to rotate between a first orientation and a second orientation with respect to an assembly; and
 the assembly being configured to pass the first piece when the first piece is in the first orientation and to block passage of the first piece when the first piece is in the second orientation, the assembly being further configured to interact with the engagement surface in a manner that applies a force to the engagement surface when the first piece is in the second orientation, the assembly and first piece being arranged such that the applied force translates the first piece along a selected path, the selected path being non-parallel to the direction of the applied force, the assembly including a first shape memory alloy responsive to an energy transfer to provide the force to be applied.

10. The apparatus of claim 9 wherein the second shape memory alloy comprises NiTi.

11. The apparatus of claim 1 wherein the first shape memory alloy is responsive to an energy transfer of thermal energy.

12. The apparatus of claim 1 wherein the first shape memory alloy is responsive to an energy transfer of electrical energy.

13. The apparatus of claim 1 wherein the first shape memory alloy is responsive to an energy transfer of magnetic energy.

14. The apparatus of claim 1 wherein the first shape memory alloy is responsive to an energy transfer of electromagnetic energy.

15. The apparatus of claim 1 wherein the first shape memory alloy is responsive to an energy transfer of mechanical energy.

16. The apparatus of claim 1 wherein the assembly is configured to deform responsive to an energy transfer.

17. The apparatus of claim 1 wherein the assembly substantially surrounds the segment.

18. The apparatus of claim 17 wherein the assembly includes a substantially ring shaped portion.

19. The apparatus of claim 17 wherein the assembly includes a substantially coiled portion.

20. The apparatus of claim 1 wherein the apparatus includes a portion having substantially circular symmetry.

21. The apparatus of claim 20 wherein the first piece has substantially circular symmetry.

22. The apparatus of claim 1 wherein the assembly includes an arm configured to make contact with the first piece.

23. The apparatus of claim 22 wherein the arm includes a handle configured to make contact with the first piece.

24. The apparatus of claim 23 wherein the handle is configured to substantially surround the first piece.

25. The apparatus of claim 1 wherein the stop is configured with a passage, said passage being configured to allow the first piece to pass.

26. The apparatus of claim 1 wherein the stop is configured to limit the motion of the first piece.

27. The apparatus of claim 1 wherein the assembly and the stop are in intimate contact.

28. The apparatus of claim 1 wherein the position of the stop is substantially fixed with respect to the assembly.

29. The apparatus of claim 1 wherein the stop includes a substantially solid plane.

30. An apparatus comprising:
 a first piece, said first piece having a segment and being configured to rotate between a first orientation and a second orientation with respect to a stop, the stop being configured to pass the first piece when the first piece is in the first orientation and to block passage of the first piece when the first piece is in the second orientation; and
 an assembly configured to engage the segment, said assembly including a first shape memory alloy responsive to an energy transfer to apply a force to the segment along a transverse direction relative to the selected path, the segment being shaped to translate the first piece along the selected path responsive to the transverse force.

31. The apparatus of claim 1 wherein the first piece includes an aperture, and wherein the stop includes a rod configured to pass through the aperture.

32. The apparatus of claim 31 wherein the rod comprises a second shape memory alloy.

33. The apparatus of claim 1 wherein the apparatus has dimensions, said dimensions being substantially micron scale.

34. The apparatus of claim 1 wherein the apparatus is configured in an array.

35. The apparatus of claim 9 wherein the first piece forms a key.

36. The apparatus of claim 9 wherein the assembly forms a lock.

37. The apparatus of claim 30 wherein the first piece forms a key.

38. The apparatus of claim 30 wherein the assembly forms a lock.

\* \* \* \* \*